United States Patent [19]

Schwab

[11] Patent Number: 4,543,627
[45] Date of Patent: Sep. 24, 1985

[54] INTERNAL COMMUNICATION ARRANGEMENT FOR A MULTIPROCESSOR SYSTEM

[75] Inventor: Thomas F. Schwab, Lisle, Ill.

[73] Assignee: AT&T Bell Laboratories, Murray Hill, N.J.

[21] Appl. No.: 330,171

[22] Filed: Dec. 14, 1981

[51] Int. Cl.[4] ........................ G06F 15/16; G06F 3/04
[52] U.S. Cl. .................................................. 364/200
[58] Field of Search ................................ 364/200, 900

[56] References Cited

U.S. PATENT DOCUMENTS

| | | | |
|---|---|---|---|
| 4,032,899 | 6/1977 | Jenny et al. | 364/200 |
| 4,181,936 | 1/1980 | Kober | 364/200 |
| 4,228,496 | 10/1980 | Katzman et al. | 364/200 |
| 4,334,305 | 6/1982 | Girardi | 364/200 |
| 4,412,285 | 10/1983 | Neches et al. | 364/200 |
| 4,418,382 | 11/1983 | Larsen et al. | 364/200 |
| 4,428,043 | 1/1984 | Catiller et al. | 364/200 |
| 4,428,046 | 1/1984 | Chari et al. | 364/200 |
| 4,430,699 | 2/1984 | Segarra et al. | 364/200 |

OTHER PUBLICATIONS

McGlynn, Daniel R., Microprocessors: Technology, Architecture, Applications, pp. 182–185, 2/22/77.

Primary Examiner—Eddie P. Chan
Attorney, Agent, or Firm—Peter Visserman

[57] ABSTRACT

A data communication arrangement in which an interface processor effects the transmission of messages between two processors of a multiprocessor system. The interface processor is connected to the communicating processors via direct memory access circuits. A sending processor stores messages in a send buffer in memory of the sending processor and controls a pointer in that memory indicating the loading of message into that buffer. The interface processor reads this pointer and the messages, and writes a pointer and the messages in a receive buffer of a receiving processor. The interface processor limits the loading of new messages into the send buffer by delaying the updating of an unload pointer, creating memory space for new messages, until the receiving processor has processed the transmitted messages. Messages can also be used to initiate the transfer of a block of data from the memory of one processor to that of another. Initialization of the interface processor is a joint effort of the communicating processors.

8 Claims, 4 Drawing Figures

INTERNAL COMMUNICATION ARRANGEMENT FOR A MULTIPROCESSOR SYSTEM

TECHNICAL FIELD

This invention deals with communications within a multiprocessor system and more specifically, techniques for transmitting messages and blocks of data between two processors in such a system.

BACKGROUND OF THE INVENTION

During the past decade, multiprocessor systems have become increasingly popular as a flexible means of ultimately achieving high-capacity performance. The many complex problems which have restricted the application of multiprocessor systems in the past are gradually being solved, but several still remain.

Among the most serious problems are those associated with transmitting information among the processors which are required to cooperate in the completion of a data processing task. Most of the techniques currently in use adversely affect the capacity and response times of the systems. Two prior art solutions which have been offered to this problem are the use of a very high speed, high capability bus directly interconnecting the processors of a tightly coupled processor system, and the use of a general data communication facility for interconnecting a loosely coupled system. Both of these approaches have significant disadvantages. The first approach requires a substantial investment in hardware in order to have access to a powerful interprocessor bus and demands sophisticated circuitry in order to achieve the high speed performance required of such a bus. The second solution requires a substantial processing overhead in order to prepare messages for transmission among processors and causes considerable delay in the transmission of messages if the data link is loaded near its capacity. Both of these solutions are especially inefficient in cases in which a very large volume of traffic in the form of interprocessor messages exists between particular pairs of processors. The problem is further aggravated if short messages predominate since the required data processing overhead per message decreases the efficiency of the communicating processors.

Another prior art solution to this kind of problem includes the use of special input/output processors to transmit messages. In this scheme, messages destined for input/output equipment, data links, or other processor systems are placed by a main processor in a memory file accessible by an input/output processor. The input/output processor can then take information out of this file and transmit such information to input/output equipment or to the input/output processor of another main processor system. The disadvantage of this kind of arrangement is that two intermediate processors (in this case input/output processors) as a minimum are required to handle communications between main processors. Delays are encountered in the transmission of the information because two intermediate storage operations are required, and because the cooperation of the two independent intermediate processors is required. These delays adversely affect the response time of the multiprocessor system.

SUMMARY OF THE INVENTION

It is an object of this invention to provide means for efficiently and reliably transmitting a high volume of relatively short messages plus occasional long messages between the processors of a multiprocessing system.

In accordance with this invention, a processor interface unit has access to the memories of two processors between which messages are to be transmitted. The two communicating processors are adapted to store information in their memories to request the transmission of messages, and to recognize the successful accomplishment of the transmission and processing of such messages. The processor interface unit reads message transmission control information from the sending processor memory indicating that new messages have been loaded into a send storage buffer means, and reads message reception control information from the memory of the receiving processor indicating that received messages have been processed from the receiving processor's receive storage buffer means. The processor interface unit modifies the transmission control information to indicate that messages have been received and processed, and modifies the reception control information to indicate that messages have been stored in the receiving processor's receive storage buffer means. The transmission control information includes storage pointers indicating how far a send storage buffer means has been loaded by the sending processor, and how much of the data in the send storage buffer means has been received and processed by the receiving processor. Reception control information includes storage pointers indicating how far a receive storage buffer means has been loaded with messages, and how far these messages have been processed by the receiving processor.

Advantageously, the processor interface unit can examine the data in messages transmitted from one processor to another. For example, in order to handle the transmission of a large block of information from an arbitrary address outside a send buffer in a sending processor to an arbitrary address outside the receive buffer in a receiving processor, the processor interface unit examines all messages in order to determine whether a message contains a block transfer request; if so, the processor interface unit determines the addresses of the sending and receiving information blocks in order to carry out the block message transmission.

In order to initialize or otherwise control the processor interface unit, or to set up parameters in this unit, or to audit its memory, it is necessary for a processor to be able to communicate with the processor interface unit. In one embodiment, an interrupt signal is transmitted from a processor through the memory access means to the processor interface unit. Since each of the processors connected to a processor interface unit may operate with independent data bases, it is advantageous to use this mechanism to permit each such processor to control the initialization of that section of the processor interface unit memory which contains the data peculiar to that processor.

The use of a processor interface unit in conjunction with transmission and reception control information as outlined above leads to a system requiring a minimum of per message data processing overhead by both receiving and transmitting processors. Hence, it is especially useful for multiprocessing systems in which processors exchange a large volume of short message traffic; in these systems, large per message overhead would be intolerable.

BRIEF DESCRIPTION OF THE DRAWING

The invention may be better understood from the following detailed description when read with reference to the drawing in which.

FIG. shows the layout of a typical data message used in such communications.

DETAILED DESCRIPTION

Figure 1:
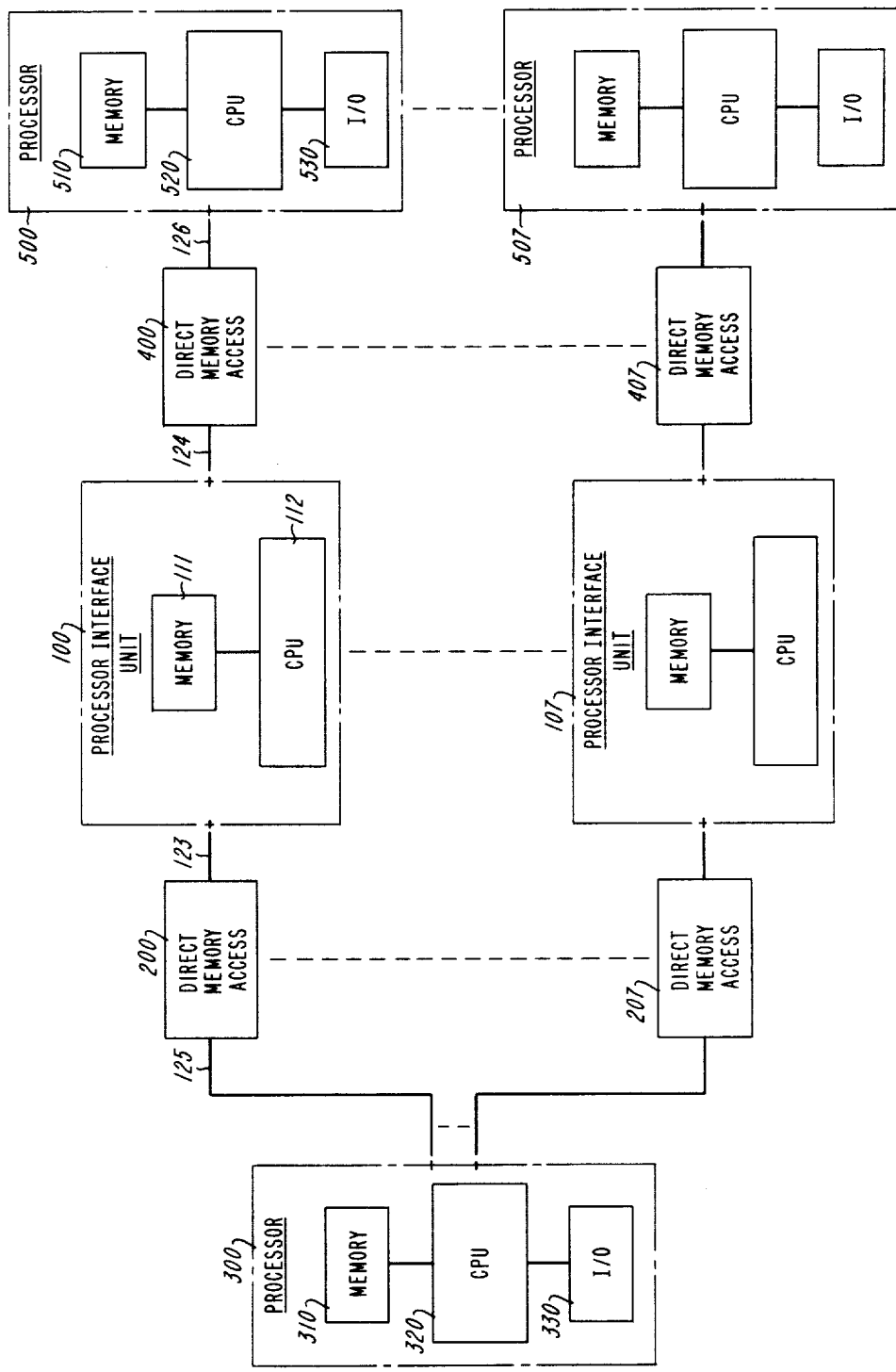
FIG. 1 represents a block diagram of an illustrative embodiment of the invention showing an arrangement in which one processor communicates with eight processors.

FIG. 1 is a basic block diagram of one embodiment of the present invention. It shows an arrangement to allow one main processor, processor 300, to communicate with eight auxiliary processors, processors 500-507. The communication with each of these processors is handled by one of the eight processor interface units (100-107). Each of the processor interface units 100-107, uses one of the direct memory access units 200-207 to communicate with processor 300, and uses one of the direct memory access units 400-407 to communicate with the associated auxiliary processor. For the sake of convenience, in this description a phrase such as: "peripheral interface unit 100 reads from, writes into, changes, or updates processor 300 or 500" should be interpreted as a brief way of saying that peripheral interface unit reads from, writes into, changes, or updates processor 300 or 500 using direct memory access 200 or 400, respectively.

Each of the auxiliary processors, 500-507, consists of memory, a central processing unit, and some form of input/output equipment. Eight auxiliary processors and interface units are depicted to illustrate the concepts of this invention. The auxiliary processors 500 through 507 may be any of a number of well-known processors, using, for example, a commercially available microprocessor, such as the Intel 8086, as a central processing unit. The memory of the processor and the central processing unit can be accessed via a standard direct memory access unit. The direct memory access units 200-207 and 400-407 are well-known and commercially available.

In this embodiment, eight direct memory access units are used to communicate with eight different processor interface units. In alternate embodiments, only one processor interface unit might be required using only one direct memory access unit to communicate with processor 300, or one multiport direct memory access unit could be used to communicate between processor 300 and eight processor interface units.

In one specific embodiment, a main processor 300 is used to control a telephone central office, not shown in the drawing. The processor comprises a memory 310, a central processing unit 320, and an input/output unit 330. A detailed description of peripheral equipment and the operation of a telephone central office may be found in the Bell System Technical Journal, Vol. XLIII, No. 5, September, 1964. A processor which may be used for this application is described in the Bell System Technical Journal, Vol. LVI, No. 2, February, 1977. The input/output unit 330 represents the switching network customarily used to interconnect telephone customers and the equipment required to receive information from customers and from other central offices. The latter information is used to control the switching network which allows customers to be interconnected.

The auxiliary processors are used for various data processing or input/output control functions less directly associated with the control of telephone connections. Messages between processor 300 and one of the auxiliary processors 500-507 are placed in separate sets of send and receive buffers in memory 310 of processor 300. Each processor interface unit 100-107 thus communicates with a different pair of buffers in memory 310. In this description, only communications between processors 300 and 500 are described in detail. Communications between processor 300 and one of the processors 501-507 are handled in the same manner, except that they use different buffer pairs in memory 310, different processor interface units, and different direct memory access units.

Communications between processors 300 and 500 are in the form of messages and data transferred via processor interface unit 100. Processor interface unit 100 includes a central processing unit 112, such as the Intel 8086 microprocessor, and a memory 111. In this example, it is assumed that processor 500 is used for communicating with a centralized traffic analysis system, (not shown). Processor 500 is connected to the traffic processing center via a data link connection which is part of the input/output system 530. From this data link, processor 500 receives a message that detailed traffic data are to be accumulated in the system. Such an incoming message acts as a request to processor 500 to accumulate traffic data, process this data, and send appropriately summarized information to the traffic center. In order to accumulate the traffic data, processor 500 must send a message to processor 300 requesting two kinds of actions: processor 300 must accumulate some traffic data internally (for example, data on usage of the switching network) and must send messages to processor 500 to allow that processor to accumulate and process other traffic data. In this example, it is necessary for main processor 300 to notify processor 500 of the duration, destination, and selected trunk used on each interoffice call.

The central processing unit 112 in processor interface unit 100 controls all of the transmission of messages from processor 300 to processor 500 and vice versa. Processor interface unit 100 has access to the memory of processor 300 via direct memory access 200 and uses this access to read messages from and to write messages into processor 300. The messages from processor 300 memory 310 are read into processor interface unit 100 memory 111, and the messages destined for processor 300 are written from processor interface unit 100 memory 111 into processor 300 memory 310. Similarly, messages destined for processor 500 are written from the processor interface unit 100 memory 111 via the direct memory access 400 into processor 500 memory 510, and messages from processor 500 to processor 300 are read from processor 500 memory 510 by the direct memory access 400 into processor interface unit 100 memory 111.

Because of the need for continuous telephone service, standby equipment (not shown) is commonly provided for critical portions of the system such as processors, direct memory access units, and peripheral interface units.

Figure 2:
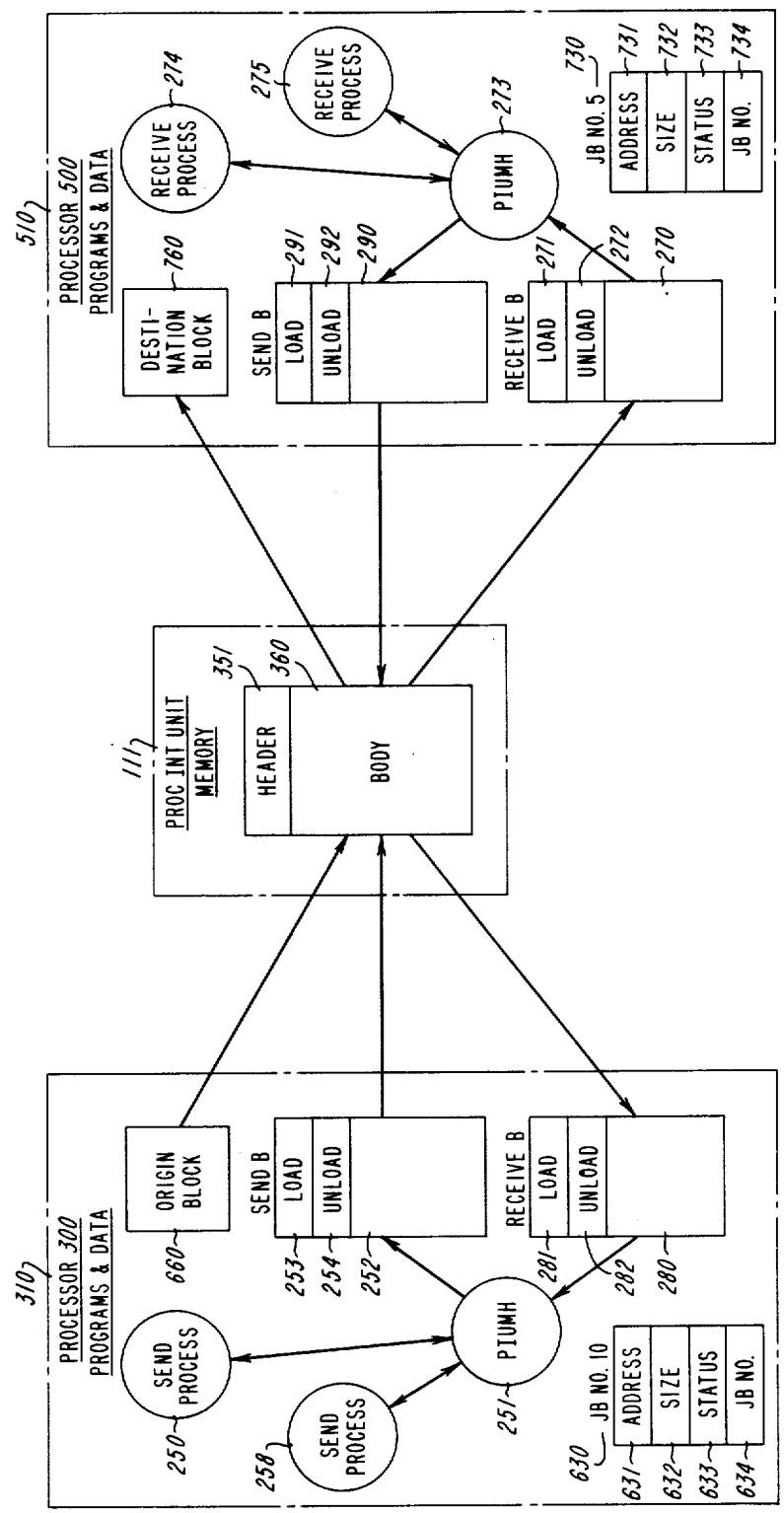
FIG. 2 shows the information flow and program control flow for communications between two processors.

FIG. 2 is a graphical representation of programs and data blocks used in transmitting, receiving, and processing messages. For the sake of clarity, arrows show the predominant direction of information flow. Processor 300 and processor 500 are each under the control of a control program referred to as an operating system. Each operating system carries out its work by initiating other programs called processes. Each process is executed by calling on appropriate program functions to carry out specific tasks. The flexibility of a multiprocessing system is substantially enhanced by allowing interaction among processes which are executed in different processors. These processes then communicate with each other via data messages.

In this example, a process 250, which executes in main processor 300, must send a message to process 274, executed in processor 500. The message is prepared by the sending process and placed in a portion of memory called a send buffer, by an interface program, the processor interface unit message handler 251 (PIUMH). One of the functions of the PIUMH 251 of processor 300 is to translate from the number of the destination process, included as part of the message, to the identity of the destination processor. Since process 274 executes on processor 500, messages to process 274 must be stored in the send buffer 252, which contains messages destined for processor 500.

To signal that a new message has been stored in the send buffer 252, a load pointer 253 is updated. The processor interface unit detects this condition, reads the message, and writes it into the receive buffer 270 of processor 500. It signals processor 500 that a message has been placed in the receive buffer 270 by updating the load pointer 271. Processor 500 also has a PIUMH, 273, which unloads the message from the receive buffer 270 and passes it on to the receive process 274. The unload pointer 272 is changed by PIUMH 273 when it recognizes that a message has been satisfactorily received, and has passed this message on to receive process 274.

Unload pointer 254 is used to limit the range of addresses in which PIUMH 251 can write new messages. Old messages cannot be discarded until assurance has been received that no retransmission of the messages will be necessary. Therefore, the unload pointer 254 of send buffer 252 is updated after receiving processor 500 has processed the message and has updated unload pointer 272.

In this embodiment, send and receive buffers of identical length in corresponding locations of memory of processors 300 and 500 are used. This allows all pointers to be the same when there are no messages to be transferred; allows differences among the load pointers to be used as an indication to the processor interface unit that a message is ready for transmission; and allows the receive buffer unload pointer to be copied into the send buffer unload pointer after a message has been processed.

Processor interface unit 100 recognizes the need for transmitting a message by reading the load pointer 253 of send buffer 252 and comparing it with the load pointer 271 of receive buffer 270. If the two pointers do not match, a new message has been loaded into send buffer 252, and should be transmitted to receive buffer 270. Also, if the load pointer 271 and unload pointer 272 of the receive buffer 270 do not match, PIUMH 273 recognizes that a message has been received and should be sent to a receiving process for further processing.

After the message has been processed, PIUMH updates the unload pointer 272, which the processor interface unit copies into unload pointer 254 of the send buffer 252 of processor 300, in order to create space in the send buffer for new messages. This mechanism automatically limits the rate of which processor 300 can generate new messages to the rate of which processor 500 can accept and process these messages.

Both the send buffer 252 and receive buffer 270 are first-in/first-out buffers arranged in a circular fashion; the first location in each of these buffers immediately succeeds the last location. This allows an indefinite number of messages to be written into these buffers as long as the buffers are cleared of old messages before new messages must be stored. New messages may be added to a send buffer as long as the load pointer continues to lag the unload pointer. The PIUMH may not load a message into a send buffer if the result would be to cause the load pointer to overtake the unload pointer.

A conventional first-in/first-out buffer is usually loaded by a first mechanism and unloaded by a second mechanism. These mechanisms are the execution of different programs on the same or different processors. The purpose of a load pointer is to indicate from the first to the second mechanism how far the buffer has been loaded. The purpose of the unload pointer is to indicate from the second to the first mechanism how far the first mechanism may write in the buffer. Sometimes, these pointers serve additional functions such as indicating where the second mechanism should start its unloading process; since this information is controlled only by the second mechanism, it can be retained separately and need not be part of the shared buffer control information. In this embodiment, in which the send and receive buffers are synchronized, it is convenient to use the load pointer of a receive buffer as the source of the information on where to start the unloading process in a send buffer, but this information, which is not controlled or needed by the sending processor, could be retained alternatively in the processor interface unit memory. An advantage of the present embodiment is that the system can continue operation even if trouble occurs in the processor interface unit and a standby unit, which would not have up-to-date pointer information, is switched into service.

Figure 3:
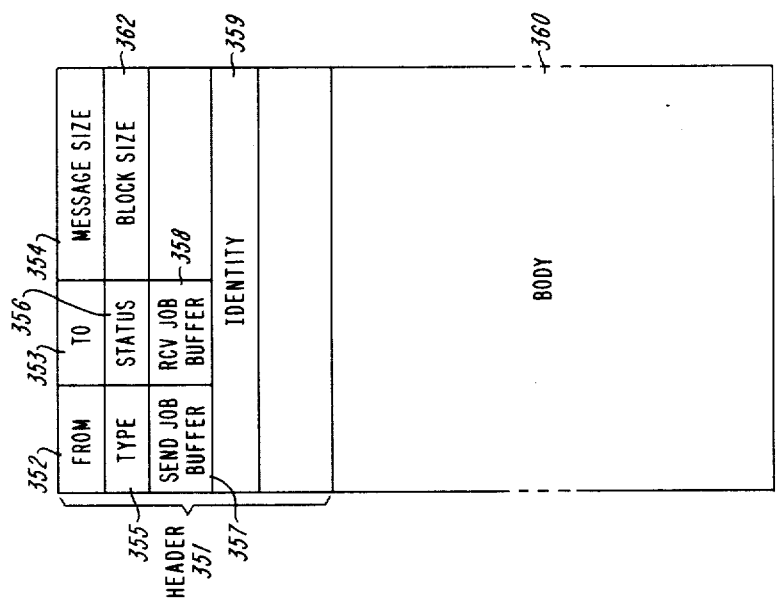

FIG. 3 shows the format of the message transmitted between processor 300 and processor 500. Every message has a standard format initial header 351, and an arbitrary length body 360. The header has a number of fields which are fixed in location in every message, and are interpreted by the receiving PIUMH and the processor interface unit. The fields are used to accomplish a number of purposes. The "from" field 352 is the identification of the sending process number. The "to" field 353 is the identification of the receiving process number. The "message size" field 354 is an indication of the total length of the message including both header and body. The "type of message" field 355 is an indication of whether this is, for example, a simple message (MSG), or one of the messages which are used to prepare for the transmission of a block of data. The "status" field 356 is used to indicate the nature of a failure. The "identity" field 359 identifies one of a series of messages from different sources, in order to allow any responses to be associated with the proper source. The "block size" field 362 indicates the length of a block to be transferred when a block transfer is requested.

Transmission of a simple data message requires only a simple exchange of the message and acknowledgment. When such a message is sent from the source processor 300 to the destination processor 500, the message type field 355 contains a number representing "Message" (MSG). After the receiving process 274 has received and processed the message passed on by the PIUMH 273, it may, optionally, generate an acknowledge message back to the send process 250. The acknowledgment message, with the message type field 355 containing a number representing "Message Acknowledgment" (MSG-ACK), would be placed in send buffer 290 by PIUMH 273; it is transmitted in essentially the same way as a simple data message.

The processor interface unit can also be used to transfer a block of data from an arbitrary location in memory of one processor to an arbitrary location in memory of another processor. If the data is transferred to the processor making the request, this is called a read block transfer; if it is transferred from the processor making the request, this is called a write block transfer. Such a transfer of information can be processed more efficiently as a block transfer than as a series of data messages, each containing a portion of the block of data to be transferred.

As mentioned previously, in response to the request from the traffic center, processor 300 sends a message to processor 500 for every completed interoffice call. Processor 300 also directly accumulates different traffic data, such as data on usage of the switching network, and stores this data in its own memory 310. When the time comes to process this data further in order to send the results to the traffic center, the data must be transmitted from processor 300 to processor 500. The best mechanism for accomplishing this data transfer is the write block transfer mechanism.

The processor interface unit plays a much broader role in the case of block transfer than it does for the transfer of simple messages. For the block transfer, also illustrated in FIG. 2, the processor interface unit must recognize that it is to read information, not only from the send buffers of the sending processor, but from an address indirectly specified by one of the messages. The processor interface unit examines the message type field 355 of the header 351 of every message to see if the message involves the preparation for a block transfer. When this type of message is recognized, the processor interface unit must find the address of the sending and receiving processor message blocks in order to carry out the block transfer.

Each processor involved in the block transfer will assign a special job buffer to help control this transfer. Job buffer 630 in processor 300 and job buffer 730 in processor 500 contain the address entries 631 and 731, and size entries 632 and 732, of the transmitted or received block of information, the status entries 633 and 733 of this block transfer, and the number of the job buffer in the other processor 634 and 734. The processor interface unit 100 reads the sending (357) and receiving (358) job buffer number fields which define the addresses of these job buffers, and then reads the job buffers in order to find the initial address, the size of the block to be transmitted, and the destination address of the block.

The process begins when the sending processor 300 sends an initial message to the receiving processor 500. The message is transmitted in the conventional way, as described above, and is placed in receive buffer 270. The message contains the sending job buffer number 630 in the send job buffer field 357, and indicates the nature of the block transfer request in the type field 355. In this case, a "write" (WT) message, i.e., a message to initiate a write block transfer, is sent in the type field 355. At some later time, the processor 500 PIUMH 273 queries the load 271 and unload 272 pointers to see if any messages have been received. When PIUMH 273 recognizes that a message has been received, it unloads the message. It recognizes a request for a block transfer in the type field 355 and assigns a job buffer 730 to the block transfer. PIUMH 273 then sends the message to the receiving process 275.

Process 275 also recognizes that a block transfer is to be made and that memory for receiving this information must be assigned. Process 275 assigns block 760. PIUMH places the address of block 760 in job buffer 730 in location 731, the size of the block to be transferred, obtained from the block size field 362, in location 732, and the current status of the transfer in location 733. At this point, the status is simply that everything is normal and that the message has not been transmitted. The job buffers also contain a field (634 and 734) indicating the number of the job buffer controlling the other end of the block transfer; this field is set up in the job buffer of the responding processor by the PIUMH, in this case PIUMH 273 in processor 500. The field is used as an integrity check to help insure that errors are contained within either processor.

Process 275 also generates a write activate message (WTA) which is placed in send buffer 290 by PIUMH 273. Processor interface unit 100 reads this message and recognizes the WTA message type in type field 355. Message type WTA is one which the processor interface unit must recognize as indicating that the processor interface unit must prepare to execute a block transfer. At this point, the processor interface unit has all the information it needs. The header of the WTA message contains an indication of the send job buffer, (transmitted as part of the previous message, and returned in the present message) and receive job buffer whose number was inserted by PIUMH 273, from the send 357 and receive buffer 358 number fields. The processor interface unit will thus be able to find the addresses of the origin block 660 and the destination block 760. It will also be able to identify the size of the block to be transferred from either 632 or 732 in job buffers 630 and 730 of the sending and receiving processors.

The processor interface unit then begins the process of transferring the block of data from block 660 to block 760. The two size fields may be different if it is desirable to reserve a larger block than necessary on one side. This will occur, for example, for a transfer of a block of data of unknown but limited length. A block transfer will transmit only necessary data from one processor to the other; the smaller length field is controlling. The processor interface unit accomplishes the block transfer by reading data from block 660 and writing the data into block 760. When the block transfer is completed, the processor interface unit sends a WTA message to processor 300. When PIUMH 251 sees the WTA message, it informs the send process 258 by sending a write acknowledgment (WT-ACK) message that processor 500 has received the block of information. PIUMH 251 then sends a Write Activate Acknowledgement (WTA-ACK) message back to processor 500 to inform receive process 275 that the block transfer has been completed.

When a processor interface unit is initially placed in service, or when a processor interface unit has been out of service for a time, it is necessary to initialize the unit. Initialization of a processor interface unit is carried out in the following manner. Processor 300, which includes circuitry for generating and accepting interrupt signals, sends a command via direct memory access 200 to processor interface unit 100 to suspend direct memory access operations. This command, which must be channeled to central processor unit 112, is treated as an interrupt. Central processing units including microprocessors such as the Intel 8086 include circuitry for accepting and generating interrupt signals. Next, another command, also treated by central processing unit 112 as an interrupt, is sent requesting that an interrupt command be sent by the processor interface unit 100 via direct memory access 400 to processor 500 to request initialization. Processor 500, using direct memory access 400, initializes a portion of the memory 111 dedicated to the special parameters which are associated with processor 500 of processor interface unit 100. When it has finished, processor 500 sends an interrupt command via direct memory access 400 to processor interface unit 100 to request that it send an interrupt command via direct memory access 200 to processor 300 to request additional initialization. Processor 300 via direct memory access 200 writes into processor interface unit 100 memory 111 the additional initialization data. Finally, processor 300 sends another interrupt to processor interface unit 100 indicating the completion of initialization; the processor interface unit 100 is now ready to begin normal operation. This method of initialization permits each of the two processor 300 and 500 to initialize a portion of the memory 111 of the processor interface unit 100. This can be useful if processors 300 and 500 have relatively independent data bases.

In a system which uses duplicated equipment, such equipment may be considered to be in one of three states: on-line, actively performing system tasks; off-line, out of service; or standby, ready to go into the on-line state upon demand. An initialization scheme such as that described above would be used whenever a processor interface unit is placed on-line in an unduplicated system, or, in a duplicated system, when a processor interface unit is switched from the off-line state directly into the on-line state because of a failure occurring while one unit is off-line. When a processor interface unit is switched from standby to on-line, a much simpler procedure than that described can be used since initialization of parameters is not required. Moreover, when a routine maintenance switch of a processor interface unit from standby to on-line is made, this switch can be initiated by the normal message mechanism. The normal message mechanism can also be used to control a switch from the off-line to the standby state.

Figure 4:
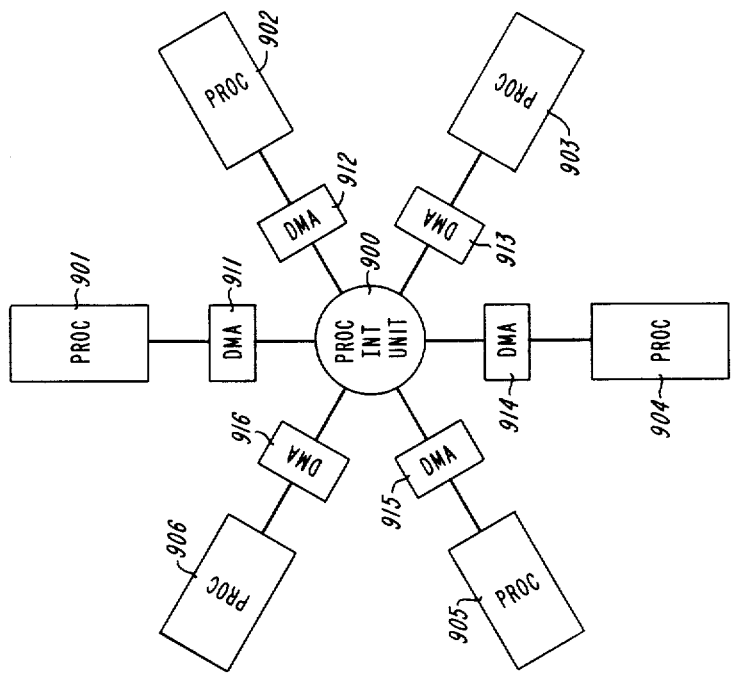
FIG. 4 represents a block diagram of an alternate multiprocessing arrangement.

This specific embodiment has been designed to match the characteristics of the specific processors used in one system, and the requirements for the kind of message traffic which is characteristic of that system. For other systems in which there is a substantial volume of information flow among many processors, a processor interface unit may be connected to all of these processors. The processor interface unit then acts as a message switch. A structure for such a system is illustrated in FIG. 4. The processor interface unit 900 is connected to a group of direct memory access circuits (911–916) each of which is connected to one of the interconnected processors (901–906). In this type of configuration, the method of operation is essentially as described with respect to FIG. 1 through 3. Each processor 901 through 906 would have a send buffer and a receive buffer for communicating with each other processor. The sending processors would use the same basic techniques for loading messages to one of the send buffers, and modifying a load pointer in that buffer; the receiving processors would use the same technique of examining load and unload pointers to see if any messages have been received, and modifying the unload pointer when a received message has been processed. The processor interface unit would control the load pointers of receive buffers and the unload pointer of send buffers. Block transfers can also be handled in the same way as described above.

It is to be understood that the above-described embodiment is merely illustrative of the principles of this invention; other arrangements may be devised by those skilled in the arts without departing from the spirit and scope of the invention.

What is claimed is:

1. A multiprocessing system comprising:
a first processor for generating first data messages and having first memory means for storing said first data messages at locations defined by a first load address indicator and a first unload address indicator;
a second processor for receiving said first data messages and having second memory means for storing said first data messages at locations defined by a second load address indicator and a second unload address indicator; and
means for controlling the transmission of data between said first and said second processor comprising:
first and second memory data transfer controllers connected to said first and said second memory means, respectively, and responsive to read and write control signals for reading from and writing into said connected memory means, and an interface processor, interposed between said first and said second memory data transfer controllers, for detecting a change in said first load address indicator, and for generating said read control signals to cause said first memory data transfer controller to read said first data messages from said first memory means at locations defined by said first load address indicator and for generating said write control signals to cause said first memory data transfer controller to modify said first unload address indicator to alter a limit of the locations in which said first processor can store new data messages and for generating said write control signals to cause said second memory data transfer controller to write said first data messages into said second memory means at locations defined by said second load address indicator and to modify said second load address indicator after said first data messages have been stored in said second memory means.

2. The multiprocessing system of claim 1 wherein said first processor receives and stores second data messages at locations in said first memory means defined by third load and unload address indicators, and said second processor generates and stores said second data messages at locations in said second memory means defined by fourth load and unload address indicators, and in which said interface processor detects a change in said fourth load indicator and further generates said read control signals to cause said second memory data transfer controller to read said second data messages from said second memory means at locations defined by said fourth load address indicator and for generating said write control signals to cause said second memory data transfer controller to modify said fourth unload address indicator to limit the locations in which said second processor can store new second data messages, and further generates said write control signals to cause said first memory data transfer controller to write said second data messages read from said second memory means into said first memory means at locations defined by said third load address indicator and to modify said third load address indicator.

3. The multiprocessing system of claim 2 in which said first and said second messages comprise block transfer messages requesting the transfer of a block of data from one of said first and said second memory means to the other of said first and said second memory means and indicating block location addresses for said block transfer and said interface processor further generates said read and write control signals to cause said first and said second memory data transfer controllers to read said block of data from said one of said first and second memory means and to write said block into the other of said first and second memory means.

4. A multiprocessing system comprising:
   a first processor for generating first data messages having first memory means for storing data messages at locations defined by a plurality of first load address indicators and first unload address indicators; a plurality of second processors, each comprising a load address indicator and unload address indicator, for receiving said first data messages and each having memory means for storing data messages at locations defined by the load and unload address indicators for that second processor; and means for controlling the transmission of data between said first processor and said plurality of second processors comprising:
   a first memory data transfer controller connected to said first memory means and responsive to read and write control signals for reading from and writing into said first memory means and a plurality of second memory data transfer controllers each connected to said memory means of one of said plurality of second processors and responsive to read and write control signals for reading from and writing into said connected memory means; interface processor means interposed between said first memory data transfer controller and said plurality of second memory data transfer controllers for detecting a change in one of said first load address indicators, for generating read control signals to cause said first memory data transfer controller to read first data messages from said first memory means at locations defined by said one of said first load address indicators, and for generating write control signals to cause said first memory data transfer controller to modify the one of said first unload address indicators corresponding to said first one of said load address indicators to alter a limit of the locations in which said first processor can store new first data messages, and for generating write control signals to cause a selected one of said plurality of second memory data transfer controllers to write said first data messages read from said first memory means into the memory means connected to said selected one of said second memory data transfer controllers and associated with the corresponding selected one of said second processors of locations defined by a load address indicator of said selected one of said plurality of second processors, and to cause said memory data controller to modify said load address indicator of said selected one of said second processors after said first data messages have been stored into said memory means associated with said selected one of said second processors.

5. The multiprocessing system of claim 4 in which said first processor further receives and stores second data messages at locations in said first memory means defined by a plurality of second load address indicators and unload address indicators, said plurality of address indicators corresponding to said plurality of second processors, in which each of said plurality of second processors comprises an other load address indicator and an other unload address indicator and generates and stores said second data messages at memory locations defined by said other load address indicator and unload address indicator, and in which said interface processor further generates said read control signals to cause a selected other of said plurality of said second memory data transfer controllers to read said second data messages from the memory means connected to said selected other of said memory data transfer controllers and associated with the corresponding selected other of said second processors at locations defined by the load address indicator and the unload address indicator of said corresponding selected other of said second processors and for generating said write control signals to cause said selected other of said memory data transfer controllers to modify said unload address indicator of said corresponding selected other of said second processors to limit the locations in which said corresponding selected other of said second processors can store new second data messages, and said interface processor further generates said write control signals to cause said first memory data transfer controller to write said second messages read from said corresponding selected other of said second processors into said first memory means at locations defined by a second address indicator and a second unload address indicator corresponding to said selected other second processor and for generating said write control signals to cause said memory data transfer controller to modify said second load address indicator corresponding to said selected other second processor.

6. In a multiprocessing system comprising a plurality of processors each having memory means for generating and storing data messages at locations defined by a first load address indicator and a first unload address indicator and for receiving and storing received data messages at locations defined by a second load address indicator and a second unload address indicator, means for controlling the transmission of data between any two processors comprising:
   a plurality of memory data transfer controllers each connected to one of said memory means and responsive to read and write control signals for reading and writing into the connected memory means, and interface processor means connected to each of said memory data transfer controllers for detecting changes in the first load address indicator of a selected one of said processors and for generating said read control signals to cause the selected one of said memory data transfer controllers connected to the memory means of said selected one of said processors to read data messages from the memory means of said selected one of said processor at locations defined by said first load address indicator of said selected one of said processor and for generating said write control signals to cause said selected one of said memory data transfer controllers to modify the first unload address indicator of said selected one of said processors to alter a limit of the memory locations at which said selected one of said processors can store new data messages and for generating said write control signals to cause another of said memory data transfer controllers to write messages read from said selected one of said processors into the memory means connected to said other memory data transfer controllers of an other selected processor at locations defined by a second load address indicator of said other selected processor and to modify said second load address indicator of said other selected processor after said data messages have been stored in said memory means connected to said other selected processor.

7. In a multiprocessing system comprising a first processor having first memory means and a second processor having second memory means, first and second memory data transfer controllers connected to said first and second memory means respectively, and responsive to read and write control signals for reading and writing into said connected memory means, and an interface processor interposed between said first and second memory data transfer controllers for generating said read and write control signals to control said first and said second memory data transfer controllers, a method for transferring a data message from said first memory means to said second memory means comprising the steps of:

storing a first data message at locations in said first memory means defined by a first load address indicator and a first unload address indicator and modifying said first load address indicator by said first processor;

detecting changes in said first load address indicator by said interface processor;

reading said first data message from said first memory means in accordance with addresses defined by said first load address indicator by said interface processor;

writing from said interface processor said first data message into said second memory means in accordance with addresses defined by a second load address indicator and a second unload address indicator;

modifying said second load address indicator by said interface processor after said first message has been stored in said second memory;

verifying integrity of said first message by said second processor;

modifying said second unload address indicator by said second processor after said first message has been verified; and reading said second unload address indicator by said interface processor and modifying said first unload address indicator by said interface processor after said second unload address indicator has been so modified.

8. The method of claim 7 in which said interface processor recognizes block transfer messages requesting the transfer of a block of data between said processors, further comprising the steps of:

generating block transfer messages requesting a block transfer by one of said processors indicating the size of the block to be transferred, the block location address in said one processor, and direction of transfer;

reading said block transfer messages by said interface processor and writing said message to the other of said processors;

processing said block transfer message by said other processor and generating a return message indicating a block location address in said other processor;

reading said return message by said interface processor;

transferring said block of data by means of said interface processor in accordance with said direction of transfer.

* * * * *

UNITED STATES PATENT AND TRADEMARK OFFICE
CERTIFICATE OF CORRECTION

PATENT NO. : 4,543,627

DATED : September 24, 1985

INVENTOR(S) : Thomas F. Schwab

It is certified that error appears in the above-identified patent and that said Letters Patent is hereby corrected as shown below:

Column 12, Claim 4, line 4, after "processors" change "of" to --at--.

[SEAL]

Signed and Sealed this

Fourteenth Day of January 1986

Attest:

Attesting Officer

DONALD J. QUIGG

Commissioner of Patents and Trademarks